(12) United States Patent
Inoue (10) Patent No.: US 8,775,036 B2
(45) Date of Patent: Jul. 8, 2014

(54) VEHICLE CONTROL DEVICE

(75) Inventor: Daisuke Inoue, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 602 days.

(21) Appl. No.: 12/980,708

(22) Filed: Dec. 29, 2010

(65) Prior Publication Data

US 2011/0196586 A1   Aug. 11, 2011

(30) Foreign Application Priority Data

Feb. 5, 2010   (JP) ................... 2010-024878

(51) Int. Cl.
*F16H 59/18* (2006.01)
*B60W 10/00* (2006.01)

(52) U.S. Cl.
USPC .................. 701/51; 477/70; 477/79; 477/86; 477/115; 477/166; 477/174; 701/67

(58) Field of Classification Search
USPC .............. 477/70, 77, 78, 79, 80, 86, 90, 115, 477/120, 166, 174, 180, 181; 701/51, 67
See application file for complete search history.

(56) References Cited

U.S. PATENT DOCUMENTS

| 6,454,676 B1* | 9/2002 | Date et al. ................... 477/77 |
| 2003/0061809 A1* | 4/2003 | Okada et al. ............... 60/345 |
| 2006/0064970 A1* | 3/2006 | Tsuzuki et al. ............. 60/361 |

FOREIGN PATENT DOCUMENTS

| JP | A-7-139613 | 5/1995 |
| JP | A-8-128344 | 5/1996 |
| JP | A-9-100902 | 4/1997 |
| JP | A-2008-144952 | 6/2008 |

* cited by examiner

Primary Examiner — Adam Tissot
(74) Attorney, Agent, or Firm — Oliff PLC (57) ABSTRACT

When a capacity coefficient (Cre) of a torque converter is larger than or equal to a predetermined threshold (CreA), a speed ratio (e) is calculated on the basis of an actual power transmission efficiency (η) by referring to a predetermined unique relationship between a power transmission efficiency (η) and a speed ratio (e). Therefore, even in a second speed ratio variation range (R2) in which the capacity coefficient (Cre) is larger than or equal to the threshold (CreA) and the speed ratio (e) is not uniquely determined for the capacity coefficient (Cre), the speed ratio (e) is calculated using the unique relationship between the speed ratio (e) and the power transmission efficiency (η), so the speed ratio (e) may be calculated in all the speed ratio variation range of the torque converter.

8 Claims, 7 Drawing Sheets

VEHICLE CONTROL DEVICE

INCORPORATION BY REFERENCE

The disclosure of Japanese Patent Application No. 2010-024878 filed on Feb. 5, 2010 including the specification, drawings and abstract is incorporated herein by reference in its entirety.

BACKGROUND OF THE INVENTION

1. Field of the Invention

The invention relates to a control device for a vehicle drive train equipped with a torque converter.

2. Description of the Related Art

A known control device for a vehicle drive train equipped with a torque converter is, for example, described in Japanese Patent Application Publication No. 7-139613 (JP-A-7-139613). The control device for a vehicle drive train, described in JP-A-7-139613, calculates the speed ratio of the torque converter on the basis of a torque converter characteristic, that is, a capacity coefficient, by referring to a predetermined relationship. The thus calculated speed ratio is, for example, used to calculate the input shaft rotational speed of an automatic transmission.

Incidentally, in the existing control device for a vehicle drive train, when the torque converter has such a characteristic that the capacity coefficient becomes a local maximum at a predetermined speed ratio in the relationship between the speed ratio and the capacity coefficient, there is a problem that the speed ratio cannot be calculated within part of a speed ratio variation range. Specifically, the relationship between the speed ratio and capacity coefficient of the torque converter generally has such a characteristic that the capacity coefficient increases from a predetermined value to the local maximum as the speed ratio increases from zero and, then, the capacity coefficient decreases to a value smaller than the predetermined value as the speed ratio further increases. Therefore, if such a characteristic is used to calculate the speed ratio, the speed ratio is not uniquely determined for capacity coefficients, other than the local maximum, larger than or equal to the predetermined value in a low speed ratio variation range in which the speed ratio is smaller than or equal to a speed ratio corresponding to the predetermined value, and, therefore, the speed ratio cannot be calculated. In contrast to this, when the speed ratio is not calculated on the basis of the capacity coefficient, it is impossible to calculate the output shaft rotational speed of the torque converter using the speed ratio. Therefore, it is necessary to provide a sensor for detecting the output shaft rotational speed. This leads to an increase in cost for manufacturing a vehicle.

SUMMARY OF INVENTION

The invention provides a control device for a vehicle drive train, which is able to calculate the speed ratio in all the speed ratio variation range of a torque converter.

An aspect of the invention provides a control device for a vehicle drive train equipped with a torque converter. The control device includes a controller that is configured to calculate a speed ratio of the torque converter on the basis of an actual power transmission efficiency by referring to a predetermined relationship between a power transmission efficiency and speed ratio of the torque converter when a capacity coefficient of the torque converter is larger than or equal to a predetermined threshold.

With the above control device for a vehicle drive train, when the capacity coefficient of the torque converter is larger than or equal to the predetermined threshold, the speed ratio may be calculated on the basis of an actual power transmission efficiency by referring to the predetermined relationship between the power transmission efficiency and the speed ratio. That is, the torque converter has such a characteristic that the capacity coefficient becomes a local maximum at a predetermined speed ratio in the relationship between the speed ratio and the capacity coefficient. Therefore, even in a speed ratio variation range in which the capacity coefficient is larger than or equal to the threshold and the speed ratio is not uniquely determined for the capacity coefficient, the speed ratio is calculated using the unique relationship between the speed ratio and the power transmission efficiency, so the speed ratio may be calculated in all the speed ratio variation range of the torque converter.

Another aspect of the invention provides a control device for a vehicle drive train equipped with a torque converter. The torque converter has such a characteristic that a relationship between a speed ratio and capacity coefficient of the torque converter has a region in which two speed ratios may be determined for a predetermined capacity coefficient and the region includes a high-speed ratio region and a low-speed ratio region located respectively on a high-speed ratio side and low-speed ratio side of a speed ratio corresponding to a local maximum of the capacity coefficient. The control device includes a controller that is configured to determine whether a speed ratio of the torque converter belongs to the high-speed ratio region or the low-speed ratio region on the basis of an actual vehicle state by referring to a predetermined relationship between a vehicle state and the high-speed ratio and low-speed ratio regions, to which the speed ratio of the torque converter belongs, when the capacity coefficient of the torque converter is larger than or equal to a predetermined threshold and to calculate the speed ratio of the torque converter on the basis of an actual capacity coefficient and the determined region to which the speed ratio belongs by referring to a predetermined relationship among the speed ratio, the capacity coefficient and the high-speed ratio and low-speed ratio regions.

With the above control device for a vehicle drive train, the torque converter has such a characteristic that a relationship between the speed ratio and capacity coefficient of the torque converter has a region in which two speed ratios may be determined for a predetermined capacity coefficient and the region includes a high-speed ratio region and a low-speed ratio region located respectively on a high-speed ratio side and low-speed ratio side of a speed ratio corresponding to a local maximum of the capacity coefficient. When the capacity coefficient of the torque converter is larger than or equal to a predetermined threshold, it is determined whether the speed ratio belongs to the high-speed ratio region or the low-speed ratio region on the basis of an actual vehicle state by referring to a predetermined relationship between a vehicle state and the high-speed ratio and low-speed ratio regions, to which the speed ratio belongs, and the speed ratio of the torque converter is calculated on the basis of an actual capacity coefficient and the determined region to which the speed ratio belongs by referring to a predetermined relationship among the speed ratio, the capacity coefficient and the high-speed ratio and low-speed ratio regions. That is, the torque converter has such a characteristic that the capacity coefficient becomes a local maximum at a predetermined speed ratio in the relationship between the speed ratio and the capacity coefficient. Therefore, even in a speed ratio variation range in which the capacity coefficient is larger than or equal to the threshold and the speed ratio is not uniquely determined for the capacity coefficient, it is determined whether the speed ratio belongs to the high-speed ratio region or the low-speed ratio region located respectively on the high-speed ratio side and low-speed ratio side of the predetermined speed ratio corresponding to the local maximum, and the speed ratio is calculated using the predetermined unique relationship between the speed ratio and the capacity coefficient in correspondence with each region, so the speed ratio may be calculated in all the speed ratio variation range of the torque converter.

In addition, in the control device for a vehicle drive train, the predetermined relationship between the vehicle state and the high-speed ratio and low-speed ratio regions, to which the speed ratio of the torque converter belongs, may be set as a relationship among the high-speed ratio and low-speed ratio regions, a vehicle speed related value and a required output related value.

With the above control device for a vehicle drive train, the predetermined relationship between the vehicle state and the high-speed ratio and low-speed ratio regions, to which the speed ratio of the torque converter belongs, may be set as a relationship among the high-speed ratio and low-speed ratio regions, a vehicle speed related value and a required output related value. Therefore, even in a speed ratio variation range in which the capacity coefficient is larger than or equal to the threshold and the speed ratio is not uniquely determined for the capacity coefficient, it is determined whether the speed ratio belongs to the high-speed ratio region or the low-speed ratio region on the basis of an actual vehicle speed related value and an actual required output related value by referring to the predetermined relationship, and the speed ratio is calculated using the predetermined unique relationship between the speed ratio and the capacity coefficient in correspondence with each region, so the speed ratio may be calculated in all the speed ratio variation range of the torque converter.

In addition, in the vehicle drive train, the predetermined relationship between the vehicle state and the high-speed ratio and low-speed ratio regions, to which the speed ratio of the torque converter belongs, may be set as a relationship among the high-speed ratio and low-speed ratio regions and a power transmission efficiency of the torque converter.

With the above control device for a vehicle drive train, the predetermined relationship between the vehicle state and the high-speed ratio and low-speed ratio regions, to which the speed ratio of the torque converter belongs, is set as a relationship among the high-speed ratio and low-speed ratio regions and a power transmission efficiency of the torque converter. Therefore, even in a speed ratio variation range in which the capacity coefficient is larger than or equal to the threshold and the speed ratio is not uniquely determined for the capacity coefficient, it is determined whether the speed ratio belongs to the high-speed ratio region or the low-speed ratio region on the basis of an actual power transmission efficiency by referring to the predetermined relationship, and the speed ratio is calculated using the predetermined unique relationship between the speed ratio and the capacity coefficient in correspondence with each region, so the speed ratio may be calculated in all the speed ratio variation range of the torque converter.

In addition, in the vehicle drive train, the torque converter may have such a characteristic that, in a relationship between a speed ratio and capacity coefficient of the torque converter, the capacity coefficient increases from a predetermined value to a local maximum as the speed ratio increases from zero and then the capacity coefficient decreases from the local maximum to a value smaller than the predetermined value as the speed ratio further increases and, therefore, the speed ratio is uniquely determined for the capacity coefficient that is smaller than the predetermined value and the speed ratio is not uniquely determined for the capacity coefficient that is larger than or equal to the predetermined value, and the threshold may be set to the predetermined value in advance.

In addition, in the control device, when the capacity coefficient of the torque converter is smaller than the threshold, the speed ratio of the torque converter may be calculated on the basis of the relationship between the speed ratio and the capacity coefficient.

With the above control device for a vehicle drive train, the torque converter has such a characteristic that, in a relationship between a speed ratio and capacity coefficient of the torque converter, the capacity coefficient increases from a predetermined value to a local maximum as the speed ratio increases from zero and then the capacity coefficient decreases from the local maximum to a value smaller than the predetermined value as the speed ratio further increases, the speed ratio is uniquely determined for the capacity coefficient that is smaller than the predetermined value and the speed ratio is not uniquely determined for the capacity coefficient that is larger than or equal to the predetermined value, and the threshold is set to the predetermined value in advance. In a speed ratio variation range in which the capacity coefficient is smaller than the threshold, the speed ratio may be calculated using the unique relationship between the speed ratio and the capacity coefficient, and, in a speed ratio variation range in which the capacity coefficient is larger than or equal to the threshold, the speed ratio may be calculated using the unique relationship between the speed ratio and the power transmission efficiency or the capacity coefficient, so the speed ratio may be calculated in all the variation range of the torque converter.

In addition, with the control device for a vehicle drive train according to the aspect of the invention, the speed ratio may be accurately calculated even in a low-speed variation range, and the input shaft rotational speed of the automatic transmission may be accurately calculated from the calculated speed ratio. Therefore, control accuracy may be improved by applying the thus calculated input shaft rotational speed to, for example, neutral control of a transmission, or the like.

Note that the control device for a vehicle drive train may calculate an output shaft rotational speed of the torque converter on the basis of the calculated speed ratio and an actual input shaft rotational speed by referring to a predetermined relationship between a speed ratio of the torque converter, an input shaft rotational speed and an output shaft rotational speed. By so doing, the output shaft rotational speed of the torque converter may be obtained without using a sensor for detecting the output shaft rotational speed. In addition, even when the sensor is used, the output shaft rotational speed may be obtained in the above manner in the event of a failure of the sensor. Therefore, for example, it is advantageous that it is not necessary to provide back-up means, such as providing another sensor in another line in preparation for a failure of the sensor.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Note that, in the following embodiments, drawings are simplified or deformed where appropriate for the sake of easy description, and the scale ratio, shape, and the like, of each component are not always drawn accurately.

Figure 1:
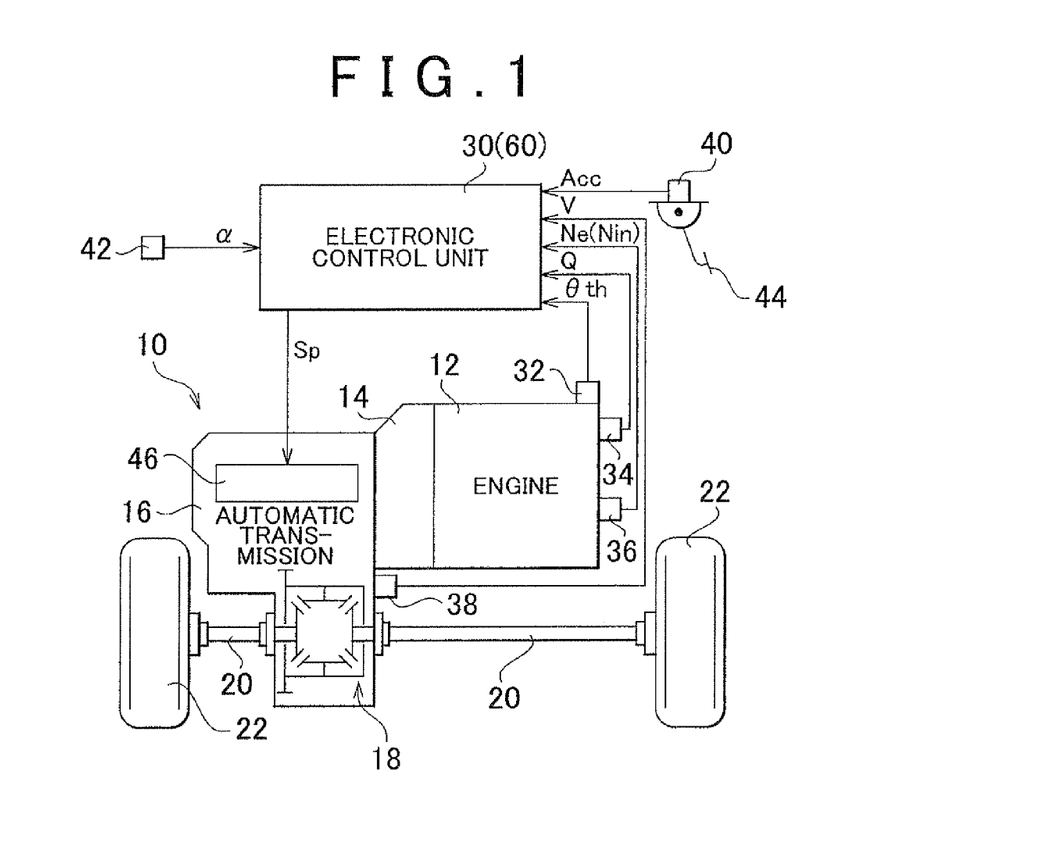
FIG. 1 is a view that shows the schematic configuration of a vehicle drive train to which a first embodiment of the invention is applied and a relevant portion of a control system provided for the vehicle.

First, a first embodiment will be described. FIG. 1 is a view that shows the schematic configuration of a vehicle drive train 10 to which a control device according to the first embodiment of the invention is applied and a relevant portion of a control system provided for the vehicle. In FIG. 1, the vehicle drive train 10 is used for a front-engine front-drive (FF) vehicle, and is provided at an output side of an engine 12 as a driving source. The vehicle drive train 10 includes a torque converter 14, an automatic transmission 16, a differential gear unit 18, a pair of driving axles 20 and a pair of driving wheels 22. The torque converter 14 serves as a fluid transmission device (fluid coupling) that transmits the power of the engine 12 using a fluid as a medium. The automatic transmission 16 converts the power of the engine 12 transmitted by the torque converter 14 into a torque (rotational speed) corresponding to a load. The differential gear unit 18 transmits power, output from the automatic transmission 16, to a pair of rotating members, that is, the pair of driving axles 20 (described later), coupled to the output side of the automatic transmission 16, while permitting a difference in rotation between the pair of driving axles 20. The pair of driving axles 20 are driven for rotation by the differential gear unit 18. The pair of driving wheels 22 are respectively coupled to the pair of driving axles 20. The vehicle drive train 10 is configured so that the output rotation of the engine 12 is transmitted to each of the pair of driving axles 20 via the torque converter 14, the automatic transmission 16 and the differential gear unit 18 and then the pair of driving wheels 22 are driven for rotation by the pair of driving axles 20.

Figure 2:
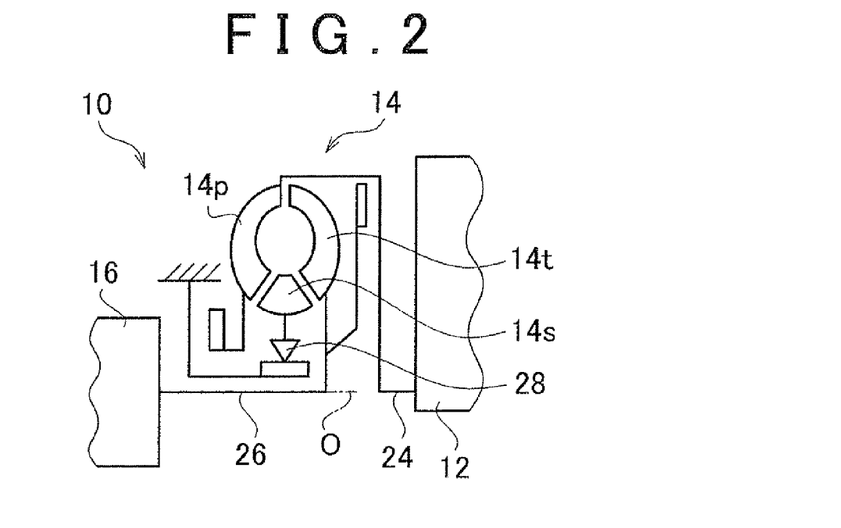
FIG. 2 is a skeleton diagram that illustrates the configuration of a torque converter shown in FIG. 1.

FIG. 2 is a skeleton view that illustrates the configuration of the torque converter 14 shown in FIG. 1. Note that the torque converter 14 is formed symmetrically with respect to the axis O, so the lower half is omitted in FIG. 2. As shown in FIG. 2, the torque converter 14 includes a pump impeller 14p, a turbine impeller 14t and a stator impeller 14s. The pump impeller 14p has an input shaft 24 coupled to the crankshaft (not shown) of the engine 12. The pump impeller 14p is driven for rotation by the engine 12 to produce the flow of fluid caused by the flow of working fluid in the torque converter 14. The turbine impeller 14t has an output shaft 26 coupled to an input member of the automatic transmission 16. The turbine impeller 14t is rotated by the flow of fluid received from the pump impeller 14p. The stator impeller 14s is provided in the flow of fluid between the turbine impeller 14t and the pump impeller 14p in order to guide fluid rotating the turbine impeller 14t toward the pump impeller 14p. The stator impeller 14s is arranged rotatably in the same direction as the rotating direction of the turbine impeller 14t owing to a one-way clutch 28. In the torque converter 14, the power of the engine 12, transmitted to the pump impeller 14p that rotates integrally with the crankshaft of the engine 12, is transmitted and output to the turbine impeller 14t through the working fluid.

Figure 3:
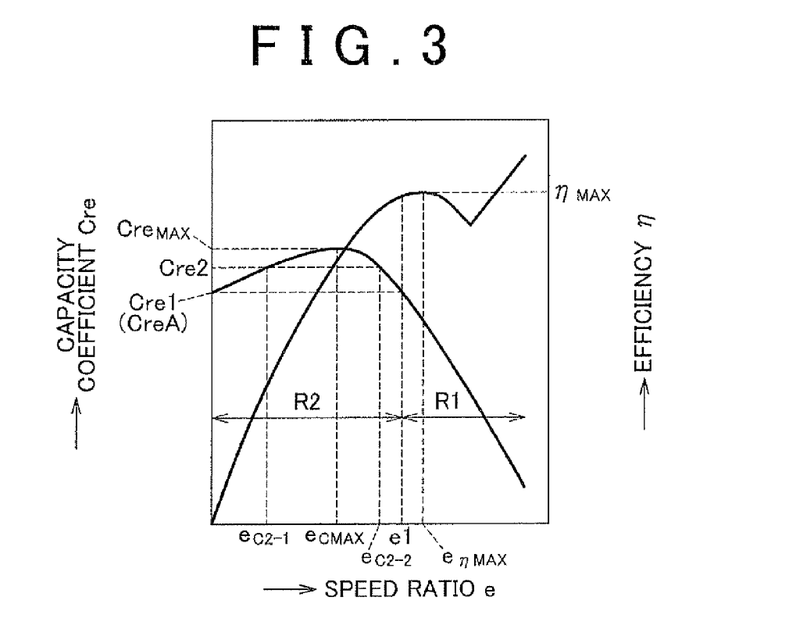
FIG. 3 is a graph that shows the performance of the torque converter shown in FIG. 1 and that shows a capacity coefficient and a power transmission efficiency along the ordinate axis with respect to a speed ratio along the abscissa axis.

FIG. 3 is a graph that shows the performance of the torque converter 14 according to the first embodiment and that shows a capacity coefficient Cre and a power transmission efficiency η along the ordinate axis with respect to a speed ratio e along the abscissa axis. The speed ratio e is expressed by the predetermined following mathematical expression (1) as the ratio between the output shaft rotational speed Nout and the input shaft rotational speed Nin of the torque converter 14. Note that the input shaft rotational speed Nin is the rotational speed of the input shaft 24 (pump impeller 14p) and is also the output shaft rotational speed of the engine 12, that is, the engine rotational speed Ne. Then, the output shaft rotational speed Nout is the rotational speed of the output shaft 26 (turbine impeller 14t) and is also the input shaft rotational speed of the automatic transmission 16.

$$e = Nout/Nin \qquad (1)$$

The capacity coefficient Cre is expressed by the following mathematical expression (2) using the input torque Tin and input shaft rotational speed Nin of the torque converter 14. The capacity coefficient Cre indicates a torque required to rotate the pump impeller 14p, that is, how much the pump impeller 14p is hard to be rotated. As the capacity coefficient Cre decreases, the pump impeller 14p easily slips with respect to the turbine impeller 14t and, therefore, the engine rotational speed Ne of the engine 9 is quickly changed. As the capacity coefficient Cre increases, the pump impeller 14p is hard to slip with respect to the turbine impeller 14t and, therefore, a difference in rotational speed between the engine rotational speed Ne of the engine 9 and the rotational speed of the turbine impeller 14t of the torque converter 14 is reduced. In addition, when the capacity coefficient Cre is large, a pump torque TP input to the pump impeller 14p in order to maintain the pump rotational speed NP of the pump impeller 14p at a predetermined value is increased as compared with when the capacity coefficient Cre is small. Note that the input torque Tin is the torque of the input shaft 24 (pump impeller 14p) and is also the torque of the engine 12, that is, the engine torque Te.

$$C = Tin/Nin^2 \qquad (2)$$

The power transmission efficiency η is the ratio between the output horsepower and input horsepower of the torque converter 14. The power transmission efficiency η is expressed by the following mathematical expression (3) as an estimated power transmission efficiency ηm using an engine torque Te [N·m], an estimated vehicle mass Mm [kg], an engine angular velocity ωe [rad/s], a vehicle speed V [m/s] and a vehicle acceleration α [m/s²]. Note that the power transmission efficiency η also indicates a vehicle state.

$$\eta m = (Mm \times \alpha \times V)/(Te \times \omega e) \qquad (3)$$

As shown in FIG. 3, the torque converter 14 according to the first embodiment has such a characteristic that, in the relationship between the speed ratio e and the capacity coefficient Cre, the capacity coefficient Cre becomes a local maximum $Cre_{MAX}$ at a predetermined speed ratio $e_{CMAX}$. Specifically, the torque converter 14 has such a characteristic that, in the relationship between the speed ratio e and the capacity coefficient Cre, the capacity coefficient Cre increases from a predetermined value Cre1 to the local maximum $Cre_{MAX}$ as the speed ratio e increases from zero and then the capacity coefficient Cre decreases to a value smaller than the predetermined value Cre1 as the speed ratio e further increases. In the torque converter 14 having such a characteristic, when the capacity coefficient Cre is smaller than the predetermined value Cre1, the speed ratio e is uniquely determined for the capacity coefficient Cre; whereas, when the capacity coefficient Cre is larger than or equal to the predetermined value Cre1, the speed ratio e is not uniquely determined for the capacity coefficient Cre other than the maximum value $Cre_{MAX}$. That is, in a high-speed ratio variation range in which the speed ratio e is uniquely determined for the capacity coefficient Cre, that is, a first speed ratio variation range R1, the capacity coefficient Cre is in one-to-one correspondence with the speed ratio e; whereas, in a low-speed ratio variation range in which the speed ratio e is not uniquely determined for the capacity coefficient Cre, that is, a second speed ratio variation range R2, two speed ratios e may be determined for one capacity coefficient Cre. For example, in the second speed ratio variation range R2, a speed ratio $e_{C2-1}$ and a speed ratio $e_{C2-2}$ may be determined for a capacity coefficient Cre2 larger than or equal to the predetermined value Cre1.

In addition, the torque converter 14 has such a characteristic that, in the relationship between the speed ratio e and the power transmission efficiency the power transmission efficiency η becomes a local maximum $\eta_{MAX}$ at a predetermined speed ratio $e_{\eta MAX}$ in a converter region having a torque amplifying action and, in a coupling region in which the torque converter 14 similarly operates as a fluid coupling, the power transmission efficiency η linearly increases from a boundary value between the coupling region and the converter region. Here, the speed ratio e is uniquely determined for the power transmission efficiency η ranging from zero to a predetermined speed ratio $e_{\eta MAX}$, and the predetermined speed ratio $e_{CMAX}$ is larger than the predetermined speed ratio $e_{\eta MAX}$. Therefore, in the second speed ratio variation range R2, the speed ratio e is uniquely determined for the power transmission efficiency η.

Referring back to FIG. 1, an electronic control unit 30 functions as the control device for the vehicle drive train 10. The electronic control unit 30 is configured to include a plurality of so-called microcomputers, each of which is formed of a CPU, a ROM, a RAM, an input/output interface, and the like. The electronic control unit 30 carries out signal processing in accordance with a program prestored in the ROM while using the temporary storage function of the RAM to thereby execute shift control of the automatic transmission 16, control for calculating the speed ratio e and output shaft rotational speed Nout of the torque converter 14, and the like. The electronic control unit 30 receives signals that indicate a throttle opening degree ηth, an intake air flow rate Q, an engine rotational speed Ne, a vehicle speed V, an accelerator operation amount (required output related value) Acc that is the operation amount of an accelerator pedal 44 and a vehicle acceleration α from a throttle opening degree sensor 32, an intake air flow rate sensor 34, an engine rotational speed sensor 36, a vehicle speed sensor 38, an accelerator operation amount sensor 40, a vehicle acceleration sensor 42, and the like. Then, the electronic control unit 30 supplies a circuit control signal Sp, or the like, for activating electromagnetic valves, or the like, included in a hydraulic control circuit 46 that shifts the gear of the automatic transmission 16.

Figure 4:
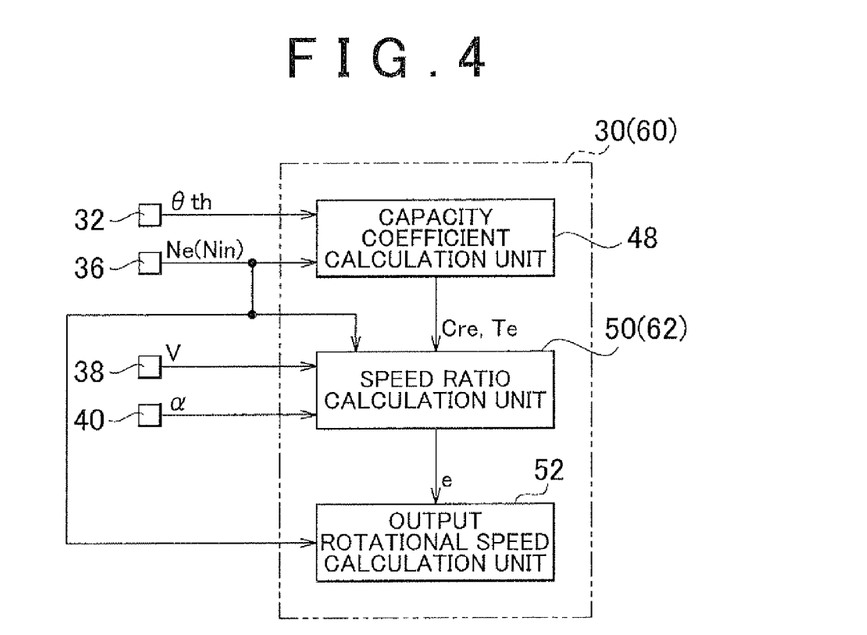
FIG. 4 is a functional block diagram for illustrating a relevant portion of control functions executed through signal processing of an electronic control unit shown in FIG. 1.

FIG. 4 is a functional block diagram for illustrating a relevant portion of control functions executed through signal processing of the electronic control unit 30. As shown in FIG. 4, the electronic control unit 30 functionally includes a capacity coefficient calculation unit 48, a speed ratio calculation unit 50 and an output shaft rotational speed calculation unit 52 as control functions for calculating the speed ratio e and output shaft rotational speed Nout of the torque converter 14. Hereinafter, control executed by these control functions will be described.

Figure 5:
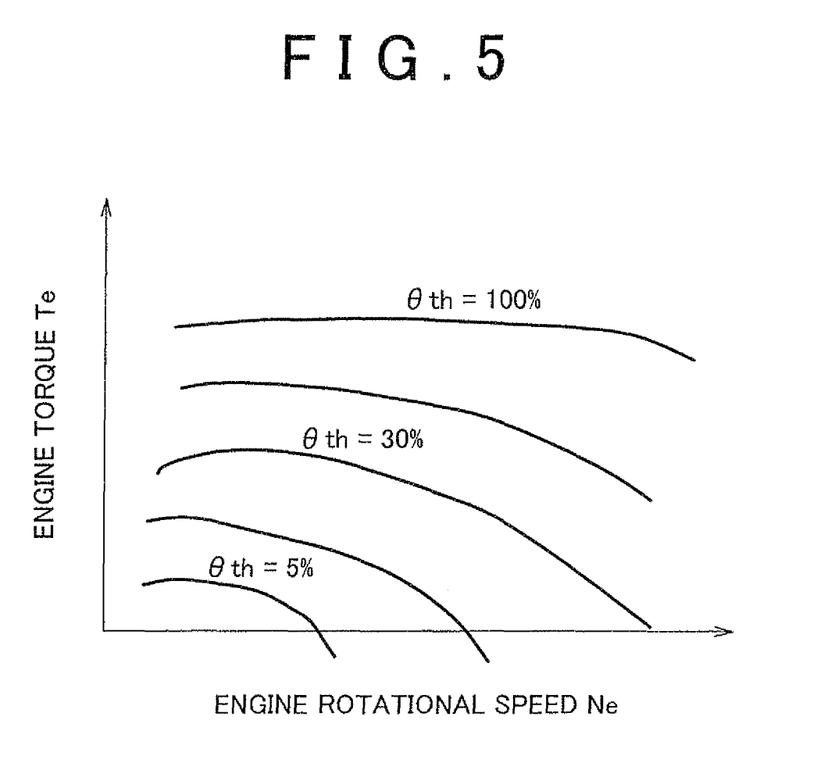
FIG. 5 is a map that shows the relationship among a throttle opening degree of an engine mounted on the vehicle, an engine rotational speed and an engine torque.

The capacity coefficient calculation unit 48 calculates a capacity coefficient Cre on the basis of an actual input shaft rotational speed Nin and an actual input torque Tin by referring to the relationship expressed by the predetermined mathematical expression (2). The input shaft rotational speed Nin is equal to the engine rotational speed Ne, and a value detected by the engine rotational speed sensor 36 is used as the input shaft rotational speed Nin. The input torque Tin is equal to the engine torque Te, and is calculated on the basis of a throttle opening degree ηth and an engine rotational speed Ne by referring to the predetermined relationship shown in FIG. 5.

The speed ratio calculation unit 50 determines whether the capacity coefficient. Cre calculated by the capacity coefficient calculation unit 48 is smaller than a threshold CreA that is preset and stored. The threshold CreA is preset to the predetermined value Cre1 and is stored. When the speed ratio calculation unit 50 determines that the capacity coefficient Cre is smaller than the threshold CreA, the speed ratio calculation unit 50, for example, calculates a speed ratio e on the basis of an actual capacity coefficient Cre calculated by the capacity coefficient calculation unit 48 by referring to the predetermined unique relationship (map) between the capacity coefficient Cre and speed ratio e of the torque converter 14, shown in FIG. 6, and then fixes the calculated speed ratio e as a value used in another control.

Figure 7:
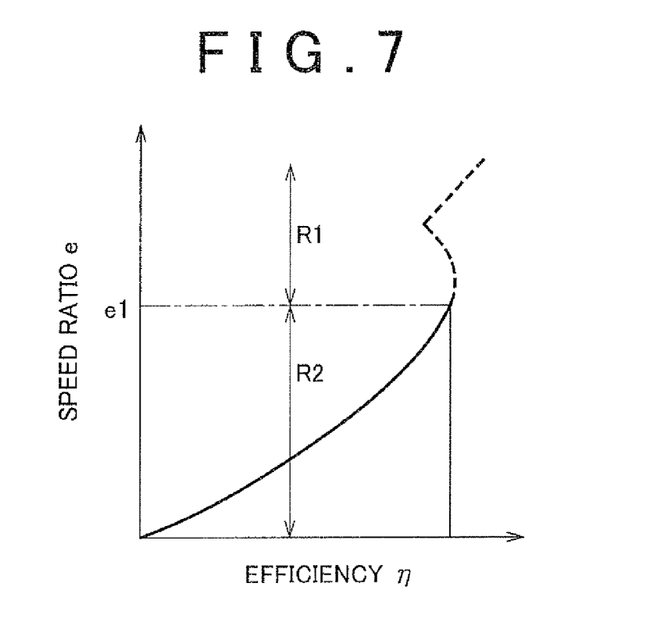
FIG. 7 is a map that shows a predetermined unique relationship between a power transmission efficiency and speed ratio of the torque converter.

On the other hand, when the speed ratio calculation unit 50 determines that the capacity coefficient Cre is not smaller than the threshold CreA, that is, the capacity coefficient Cre is larger than or equal to the threshold CreA, the speed ratio calculation unit 50, for example, calculates a speed ratio e on the basis of an actual power transmission efficiency η by referring to the predetermined unique relationship (map) between the power transmission efficiency η and speed ratio e of the torque converter 14, shown in FIG. 7, and then fixes the speed ratio e as a value used in another control. The actual power transmission efficiency η is an estimated power transmission efficiency ηm calculated using the following mathematical expression (3). Note that the engine angular velocity ωe is obtained by converting the engine rotational speed Ne, and the estimated vehicle mass Mm is a constant that is preset and stored.

The output shaft rotational speed calculation unit 52 calculates an output shaft rotational speed Nout on the basis of an actual input shaft rotational speed Nin (engine rotational speed Ne) and the speed ratio e calculated by the speed ratio calculation unit 50 by referring to the predetermined relationship expressed by the mathematical expression (1).

Figure 8:
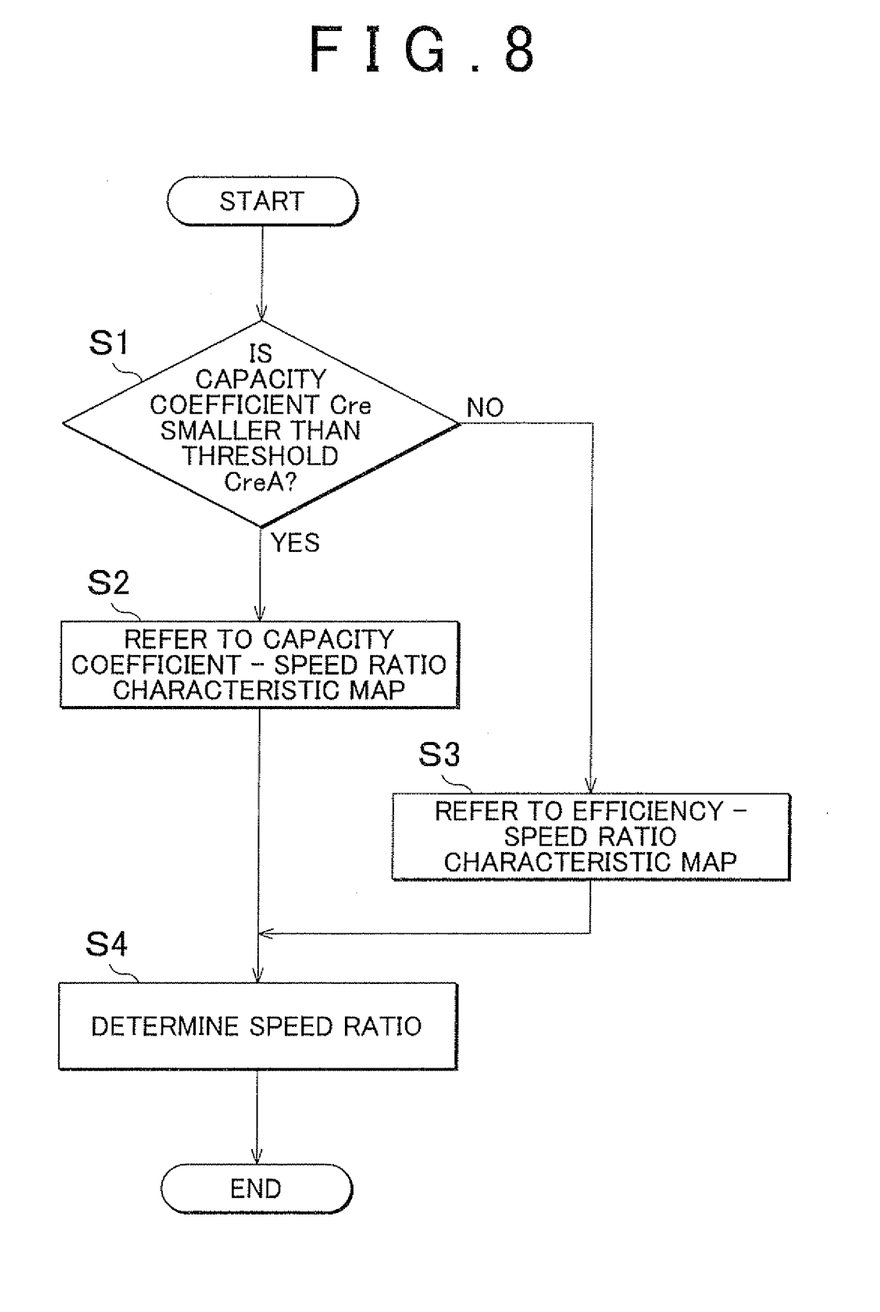
FIG. 8 is a flowchart that illustrates a relevant portion of control operation executed through signal processing of the electronic control unit shown in FIG. 1.

FIG. 8 is a flowchart that illustrates a relevant portion of control operation executed through signal processing of the electronic control unit 30. The flowchart illustrates control operation for calculating and determining a speed ratio e within control operation executed by the electronic control unit 30. The flowchart is, for example, repeatedly executed at an extremely short cycle time of about several milliseconds to several tens of milliseconds.

In FIG. 8, first, in step (hereinafter, "step" is omitted) S1 corresponding to the capacity coefficient calculation unit 48 and the speed ratio calculation unit 50, a capacity coefficient Cre is calculated on the basis of an actual input shaft rotational speed Nin and an actual input torque Tin by referring to the predetermined relationship expressed by the mathematical expression (2), and then it is determined whether the calculated capacity coefficient Cre is smaller than the predetermined threshold CreA.

Figure 6:
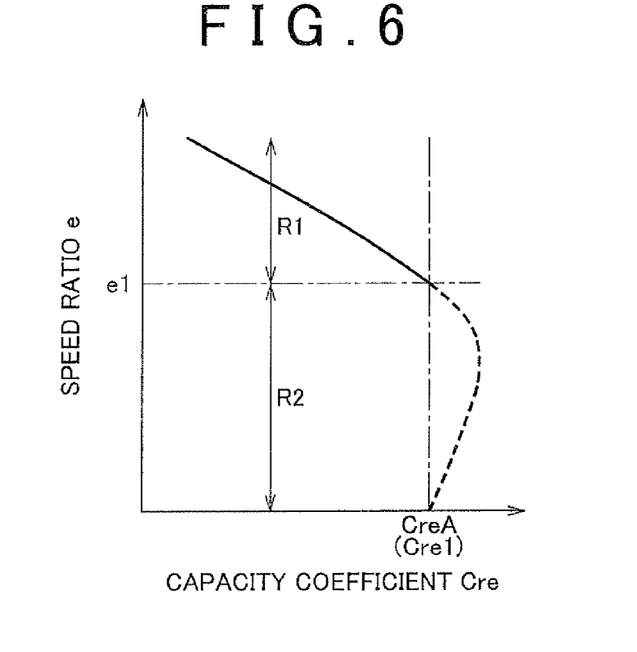
FIG. 6 is a map that shows a predetermined unique relationship between a capacity coefficient and speed ratio of the torque converter.

When the determination of S1 is affirmative, in S2 corresponding to the speed ratio calculation unit 50, a speed ratio e is calculated on the basis of the actual capacity coefficient Cre calculated in S1 by referring to the predetermined unique relationship (map) between the capacity coefficient Cre and speed ratio e of the torque converter 14, shown in FIG. 6.

When the determination of S1 is negative, in S3 corresponding to the speed ratio calculation unit 50, a speed ratio e is calculated on the basis of an actual power transmission efficiency η by referring to the predetermined unique relationship (map) between the power transmission efficiency η and speed ratio e of the torque converter 14, shown in FIG. 7. The actual power transmission efficiency η is an estimated power transmission efficiency ηm calculated using the mathematical expression (3).

Subsequent to S2 and S3, in S4 corresponding to the speed ratio calculation unit 50, the speed ratio e calculated in any one of S2 and S3 is fixed as a value used in another control, after which the routine ends.

With the electronic control unit 30 that serves as the control device for the vehicle drive train 10 according to the first embodiment, the torque converter 14 has such a characteristic that the capacity coefficient Cre becomes the local maximum $Cre_{MAX}$ at the predetermined speed ratio $e_{CMAX}$ in the relationship between the speed ratio e and the capacity coefficient Cre and then the speed ratio e is not uniquely determined for the capacity coefficient Cre, other than the local maximum $Cre_{MAX}$, that is larger than or equal to the predetermined value Cre1. When the capacity coefficient Cre of the torque converter 14 is larger than or equal to the threshold CreA preset to the predetermined value Cre1, a speed ratio e is calculated on the basis of an actual power transmission efficiency η by referring to the predetermined unique relationship (map) between the power transmission efficiency η and the speed ratio e. Therefore, even in the second speed ratio variation range R2 in which the capacity coefficient Cre is larger than or equal to the threshold CreA and the speed ratio e is not uniquely determined for the capacity coefficient Cre, a speed ratio e may be calculated using the unique relationship between the speed ratio and the power transmission efficiency. In addition, in the first speed ratio variation range R1 in which the capacity coefficient Cre is smaller than the threshold CreA and the speed ratio e is uniquely determined for the capacity coefficient Cre, a speed ratio e may be calculated using the predetermined unique relationship (map) between the speed ratio e and the capacity coefficient Cre. Therefore, the speed ratio e may be calculated in all the speed ratio variation range of the torque converter 14.

Next, a second embodiment of the invention will be described. Note that, in the following description of the second embodiment, like reference numerals denote substantially similar components to those of the first embodiment and the description thereof is omitted.

Figure 9:
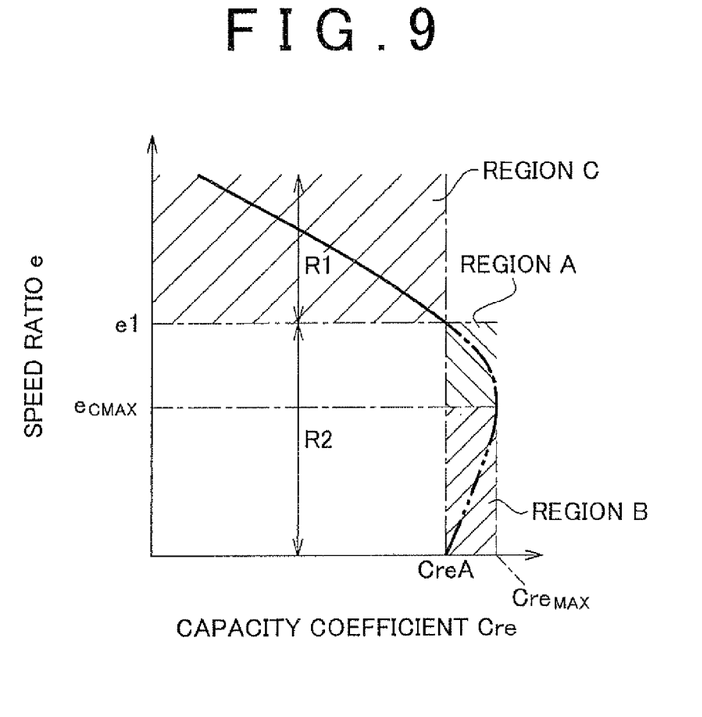
FIG. 9 is a map that shows a predetermined relationship between a speed ratio and capacity coefficient of the torque converter.

The torque converter 14 shown in FIG. 1 has such a characteristic that the relationship between the speed ratio e and the capacity coefficient C, shown in FIG. 9, has a region (high-speed ratio region A and low-speed ratio region B) in which two speed ratios e may be determined for a predetermined capacity coefficient Cre and then the region includes the high-speed ratio region A and the low-speed ratio region B that are located respectively on the high-speed ratio side and low-speed ratio side of a speed ratio $e_{CMAX}$ corresponding to the local maximum $Cre_{MAX}$ of the capacity coefficient Cre.

As shown in FIG. 4, an electronic control unit 60 that serves as a control device for the vehicle drive train 10 according to the second embodiment functionally includes the capacity coefficient calculation unit 48, a speed ratio calculation unit 62 and the output shaft rotational speed calculation unit 52 for calculating the speed ratio e and output shaft rotational speed Nout of the torque converter 14.

Figure 10:
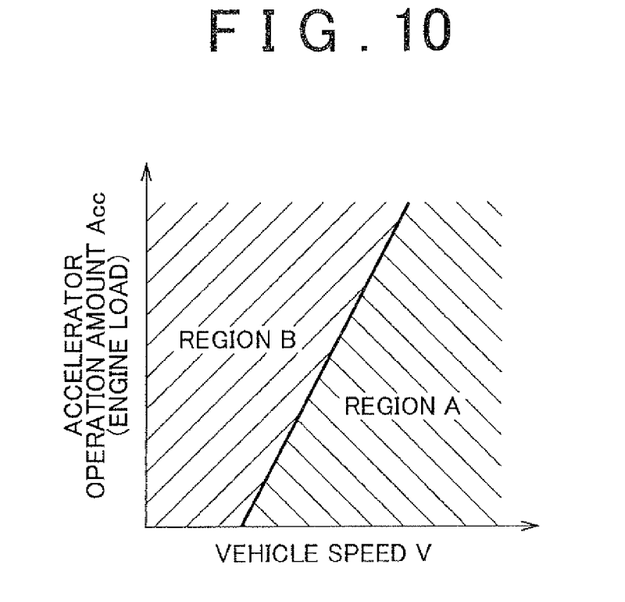
FIG. 10 is a map that shows a predetermined relationship among high-speed ratio and low speed ratio regions to which the speed ratio of the torque converter belongs, a vehicle speed and an accelerator operation amount.

The speed ratio calculation unit 62 determines whether the capacity coefficient Cre calculated by the capacity coefficient calculation unit 48 is smaller than the threshold CreA that is preset and stored. When the speed ratio calculation unit 62 determines that the capacity coefficient Cre is not smaller than the threshold CreA, that is, when the capacity coefficient Cre is larger than or equal to the threshold CreA, the speed ratio calculation unit 62, for example, determines whether the speed ratio e belongs to the high-speed ratio region A or the low-speed ratio region B that are located respectively on the high-speed ratio side and low-speed ratio side of the predetermined speed ratio $e_{CMAX}$ on the basis of an actual vehicle speed (vehicle speed related value) V and an actual accelerator operation amount (required output related value) Acc by referring t the predetermined relationship (map) among the high-speed ratio and low-speed ratio regions A and B, to which the speed ratio e of the torque converter 14 belongs, the vehicle speed V and the accelerator operation amount Acc, shown in FIG. 10. Then, the speed ratio calculation unit 62 calculates a speed ratio e on the basis of an actual capacity coefficient Cre and the determined region to which the speed ratio e belongs by referring to the predetermined relationship among the speed ratio e, the capacity coefficient Cre and the high-speed ratio and low-speed ratio regions in the second speed ratio variation range R2 within the relationship between the speed ratio e and the capacity coefficient Cre, shown in FIG. 9, using the predetermined unique relationship between the speed ratio e and the capacity coefficient Cre, indicated by the alternate long and short dash line and the alternate long and two short dashes line in correspondence with the respective regions A and B; and then fixes the calculated speed ratio e as a value used in another control. In the relationship between the speed ratio e and the capacity coefficient Cre, the low-speed ratio region B is set so that the capacity coefficient Cre is larger than or equal to the threshold CreA and the speed ratio e is smaller than or equal to the predetermined speed ratio $e_{CMAX}$. Then, in the relationship between the speed ratio e and the capacity coefficient Cre, the high-speed ratio region A is set so that the capacity coefficient Cre is larger than or equal to the threshold CreA and the speed ratio e is larger than the predetermined speed ratio $e_{CMAX}$ and is smaller than or equal to a speed ratio e1 corresponding to the threshold CreA. Note that the relationships (maps) shown in FIG. 9 and FIG. 10 are, for example, empirically or theoretically obtained in advance and stored. Note that the accelerator operation amount Acc and the vehicle speed V indicate a vehicle state; instead, the accelerator operation amount Acc may be replaced with another required output related value, such as a throttle opening degree ηth, and the vehicle speed V may be replaced with another vehicle speed related value, such as the output shaft rotational speed of the automatic transmission 16 and the rotational speed of each driving wheel 22.

On the other hand, when the speed ratio calculation unit 62 determines that the capacity coefficient Cre is smaller than the threshold CreA, the speed ratio calculation unit 62, for example, calculates a speed ratio e on the basis of an actual capacity coefficient Cre calculated by the capacity coefficient calculation unit 48 by referring to the predetermined unique relationship between the speed ratio e and the capacity coefficient Cre, indicated by a region C, within the relationship between the speed ratio e and the capacity coefficient Cre, shown in FIG. 9, and then fixes the calculated speed ratio e as a value used in another control.

Figure 11:
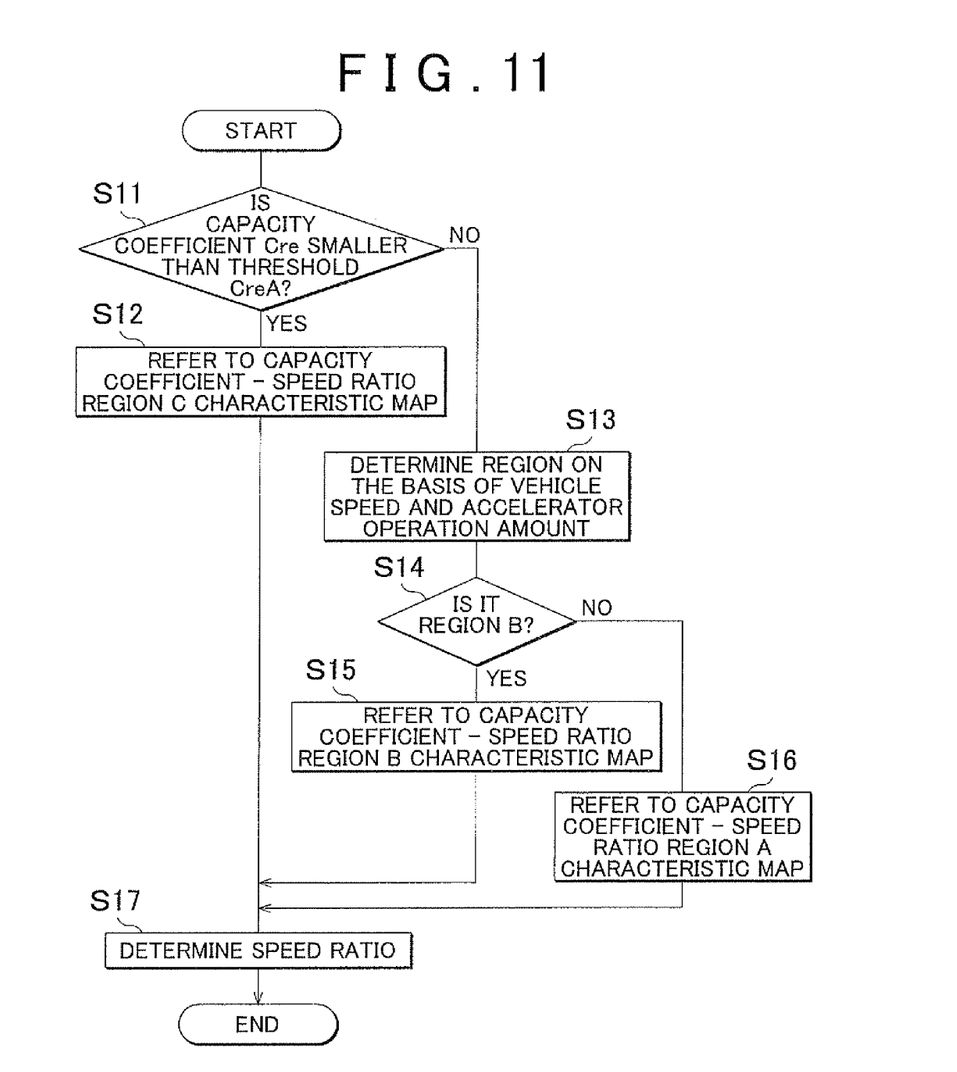
FIG. 11 is a flowchart that shows a relevant portion of control operation executed through signal processing of an electronic control unit according to a second embodiment of the invention.

FIG. 11 is a flowchart that illustrates a relevant portion of control operation executed through signal processing of the electronic control unit 30. The flowchart illustrates control operation for calculating and determining a speed ratio e within control operation executed by the electronic control unit 60. The flowchart is, for example, repeatedly executed at an extremely short cycle time of about several milliseconds to several tens of milliseconds.

In FIG. 11, first, in step (hereinafter, "step" is omitted) S11 corresponding to the capacity coefficient calculation unit 48 and the speed ratio calculation unit 62, a capacity coefficient Cre is calculated on the basis of an actual input shaft rotational speed Nin and an actual input torque Tin by referring to the predetermined relationship expressed by the mathematical expression (2), and then it is determined whether the calculated capacity coefficient Cre is smaller than the predetermined threshold CreA.

When the determination of S11 is affirmative, in S12 corresponding to the speed ratio calculation unit 62, a speed ratio e is calculated on the basis of the actual capacity coefficient Cre calculated in S11 by referring to the predetermined unique relationship between the capacity coefficient Cre and speed ratio e of the torque converter 14, indicated by the region C in FIG. 9.

When the determination of S11 is negative, in 513 corresponding to the speed ratio calculation unit 62, it is determined whether the speed ratio e belongs to the high-speed ratio region A or the low-speed ratio region B that are located respectively on the high-speed ratio side and low-speed ratio side of the predetermined speed ratio $e_{CMAX}$ on the basis of an actual vehicle speed V and an actual accelerator operation amount Acc by referring to the predetermined relationship, that is, the map, among the high-speed ratio and low-speed ratio regions A and B, to which the speed ratio e of the torque converter 14 belongs, the vehicle speed V and the accelerator operation amount Ace, shown in FIG. 9.

Subsequent to S13, in 514 corresponding to the speed ratio calculation unit 62, it is determined whether it is determined in S13 that the speed ratio e belongs to the low-speed ratio region B.

When the determination of S14 is affirmative, in S15 corresponding to the speed ratio calculation unit 62, a speed ratio e is calculated on the basis of the actual capacity coefficient Cre calculated in S11 by referring to the predetermined unique relationship between the capacity coefficient Cre and speed ratio e of the torque converter 14, indicated by the alternate long and two short dashes line in the low-speed ratio region B in FIG. 9.

When the determination of S14 is negative, in S16 corresponding to the speed ratio calculation unit 62, a speed ratio e is calculated on the basis of the actual capacity coefficient Cre calculated in S11 by referring to the predetermined unique relationship between the capacity coefficient Cre and speed ratio e of the torque converter 14, indicated by the alternate long and short dash line in the high-speed ratio region A in FIG. 9.

Subsequent to S15 and S16, in S17 corresponding to the speed ratio calculation unit 62, the speed ratio e calculated in any one of S15 and S16 is fixed as a value used in another control, after which the routine ends.

With the electronic control unit 60 that serves as the control device for the vehicle drive train 10, the torque converter 14 has such a characteristic that the capacity coefficient Cre becomes the local maximum $Cre_{MAX}$ at the predetermined speed ratio $e_{CMAX}$ in the relationship between the speed ratio e and the capacity coefficient Cre, the relationship between the speed ratio e and the capacity coefficient C has a region in which two speed ratios e may be determined for a predetermined capacity coefficient Cre and then the region includes the high-speed ratio region A and the low-speed ratio region B located respectively on the high-speed ratio side and low-speed ratio side of the speed ratio $e_{CMAX}$ corresponding to the local maximum $Cre_{MAX}$ of the capacity coefficient Cre. When the capacity coefficient Cre of the torque converter 14 is larger than or equal to the threshold CreA preset to the predetermined value Cre1, it is determined whether the speed ratio e belongs to the high-speed ratio region A or the low-speed ratio region B located respectively on the high-speed ratio side and low-speed ratio side of the predetermined speed ratio e on the basis of the actual vehicle speed V and the actual accelerator operation amount Ace by referring to the predetermined relationship, that is, the map, among the high-speed ratio and low-speed ratio regions A and B to which the speed ratio e of the torque converter 14 belongs, the vehicle speed V and the accelerator operation amount Ace, and then a speed ratio e is calculated on the basis of the actual capacity coefficient Cre and the determined region to which the speed ratio e belongs by referring to the predetermined relationship among the speed ratio e, the capacity coefficient Cre and the high-speed ratio and low-speed ratio regions A and B using the predetermined unique relationship between the speed ratio e and the capacity coefficient Cre in correspondence with each region. Therefore, even in the second speed ratio variation range R2 in which the capacity coefficient Cre is larger than or equal to the threshold CreA and the speed ratio e is not uniquely determined for the capacity coefficient Cre, a speed ratio e is calculated using the predetermined unique relationship between the speed ratio e and the capacity coefficient Cre in correspondence with each region. In addition, in the first speed ratio variation range R1 in which the capacity coefficient Cre is smaller than the threshold CreA and the speed ratio e is uniquely determined for the capacity coefficient Cre, a speed ratio e is calculated using the predetermined unique relationship between the speed ratio e and the capacity coefficient Cre. Therefore, the speed ratio e may be calculated in all the speed ratio variation range of the torque converter 14.

The embodiments of the invention are described in detail as an example with reference to the accompanying drawings; however, the aspect of the invention is not limited to the above embodiments but it may be modified into an alternative embodiment.

Figure 12:
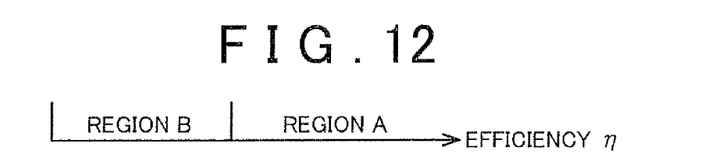
FIG. 12 is a view that shows a predetermined relationship between high-speed ratio and low-speed ratio regions to which the speed ratio of the torque converter belongs and a power transmission efficiency.

For example, in the above second embodiment, when the speed ratio calculation unit 62 determines that the capacity coefficient Cre is larger than or equal to the threshold CreA, the speed ratio calculation unit 62 determines whether the speed ratio e belongs to the high-speed ratio region A or the low-speed ratio region B on the basis of the actual vehicle speed V and the actual accelerator operation amount Acc by referring to the predetermined relationship, that is, the map, among the high-speed ratio and low-speed ratio regions A and B, to which the speed ratio e of the torque converter 14 belongs, the vehicle speed V and the accelerator operation amount Acc; instead, the map shown in FIG. 10 may be replaced, for example, with the one shown in FIG. 12. FIG. 12 is a view that shows a predetermined relationship between the high-speed ratio and low-speed ratio regions A and B, to which the speed ratio e of the torque converter 14 belongs, and the power transmission efficiency η of the torque converter 14. The relationship is empirically or theoretically obtained in advance. The speed ratio calculation unit 62 may determine whether the speed ratio e belongs to the high-speed ratio region A or the low-speed ratio region B on the basis of an actual power transmission efficiency η by referring to the relationship shown in FIG. 12.

In addition, the vehicle drive train 10 according to the above described first and second embodiments is intended for an FF vehicle; however, the aspect of the invention is not limited. For example, the aspect of the invention may be applied to a vehicle drive train intended for a vehicle that employs another drive system, such as a vehicle drive train intended for an FR vehicle, a vehicle drive train intended for an MR vehicle and a vehicle drive train intended for an RR vehicle. In addition, the aspect of the invention is not limited to a vehicle drive train for a two-wheel drive vehicle. For example, the aspect of the invention may also be applied to a vehicle drive train for a four-wheel drive vehicle.

Note that the above described embodiments are only illustrative; the aspect of the invention may be modified or improved in various forms on the basis of the knowledge of a person skilled in the art without departing from the scope of the invention although not illustrated one by one.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A control device for a vehicle drive train equipped with a torque converter, comprising:
a controller that is configured to calculate a speed ratio of the torque converter on the basis of an actual power transmission efficiency of the torque converter by referring to a predetermined relationship between a power transmission efficiency and speed ratio of the torque converter when a capacity coefficient of the torque converter is larger than or equal to a predetermined threshold, wherein:
a relationship exists between the speed ratio and capacity coefficient of the torque converter, such that:
the capacity coefficient increases from a predetermined value to a local maximum as the speed ratio increases from zero;
then the capacity coefficient decreases from the local maximum to a value smaller than the predetermined value as the speed ratio further increases;
a single value for the speed ratio is determined when the capacity coefficient is smaller than the predetermined value;
no single value for the speed ratio is determined when the capacity coefficient is larger than or equal to the predetermined value; and
the predetermined threshold is set to the predetermined value in advance.

2. The control device according to claim 1, wherein when the capacity coefficient of the torque converter is smaller than the threshold, the speed ratio of the torque converter is calculated on the basis of the relationship between the speed ratio and the capacity coefficient.

3. A control device for a vehicle drive train equipped with a torque converter, wherein
a predetermined relationship exists between a speed ratio and a capacity coefficient of the torque converter such that a region exists in which two speed ratios may be determined for a predetermined capacity coefficient; and
the region includes a high-speed ratio region and a low-speed ratio region located respectively on a high-speed ratio side and a low-speed ratio side of a speed ratio corresponding to a local maximum of the capacity coefficient; and
the control device comprises:
a controller configured to:
when the capacity coefficient of the torque converter is larger than or equal to a predetermined threshold, determine whether a speed ratio of the torque converter belongs to a high-speed ratio region or a low-speed ratio region based on an actual vehicle state by referring to a predetermined relationship between a vehicle state and the high-speed ratio region and the low-speed ratio; and
calculate the speed ratio of the torque converter based on an actual capacity coefficient and the high-speed ratio region or the low-speed ratio region by referring to the predetermined relationship among the speed ratio, the capacity coefficient and the high-speed ratio region and the low-speed ratio region, wherein:
a relationship exists between the speed ratio and capacity coefficient of the torque converter, such that:
the capacity coefficient increases from a predetermined value to a local maximum as the speed ratio increases from zero;
then the capacity coefficient decreases from the local maximum to a value smaller than the predetermined value as the speed ratio further increases;
a single value for the speed ratio is determined for the capacity coefficient that is smaller than the predetermined value;

no single value for the speed ratio is determined for the capacity coefficient that is larger than or equal to the predetermined value; and the threshold is set to the predetermined value in advance.

4. The control device according to claim 3, wherein the predetermined relationship between the vehicle state and the high-speed ratio region and low-speed ratio region is set as a relationship among the high-speed ratio region and low-speed ratio region, a vehicle speed related value, and a required output related value.

5. The control device according to claim 4, wherein the vehicle speed related value includes any one of an actual vehicle speed, an output shaft rotational speed and a driving wheel rotational speed.

6. The control device according to claim 4, wherein the required output related value includes any one of an accelerator operation amount and a throttle opening degree.

7. The control device according to claim 3, wherein the predetermined relationship between the vehicle state and the high-speed ratio region and low-speed ratio region is set as a relationship among the high-speed ratio and low-speed ratio regions and a power transmission efficiency of the torque converter.

8. The control device according to claim 3, wherein when the capacity coefficient of the torque converter is smaller than the threshold, the speed ratio of the torque converter is calculated on the basis of the relationship between the speed ratio and the capacity coefficient.

\* \* \* \* \*